2,826,607
RECOVERY OF PHTHALIC ACIDS

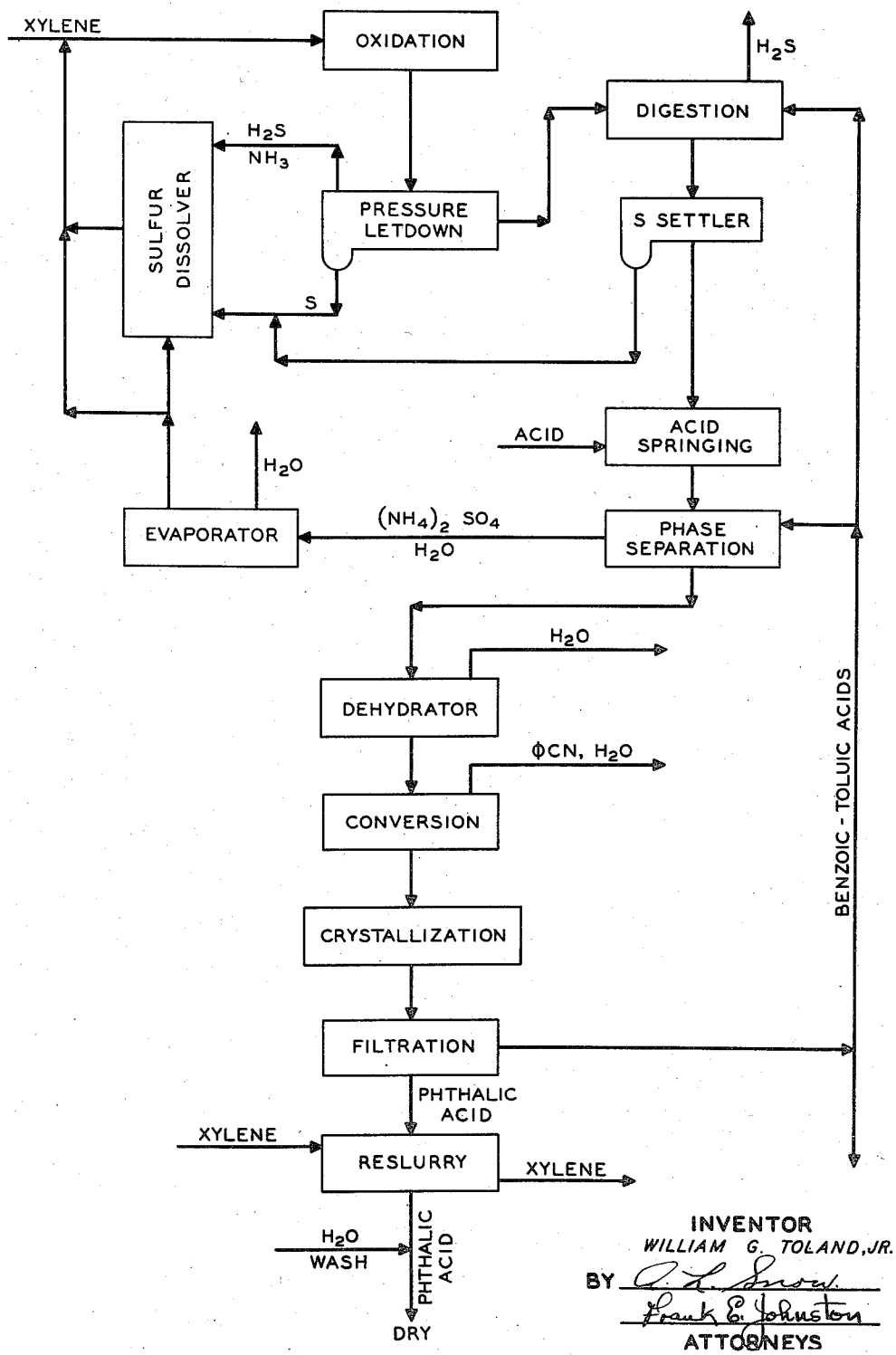

William G. Toland, Jr., San Rafael, Calif., assignor to California Research Corporation, San Francisco, Calif., a corporation of Delaware Application December 6, 1954, Serial No. 473,253

2 Claims. (Cl. 260—525)

This invention relates to a process for recovering substantially pure phthalic acids from mixtures consisting predominantly of phthalic acid values present in the form of ammonium salts of phthalic acids and amides of phthalic acids.

My copending application, Serial No. 371,209, filed July 30, 1953 (now U. S. Patent No. 2,722,549, issued November 1, 1955), describes a process for producing phthalic acids from xylenes by oxidizing xylenes with water, ammonium sulfate and an inorganic sulfur compound containing sulfur at a valence below plus 6 by heating a mixture of these materials to a temperature in the range from about 550° F. to 700° F. and under a pressure sufficient to maintain a part of the water in liquid phase, to produce a reaction product comprising phthalic acid amides and ammonium salts, and then hydrolyzing the reaction product to liberate phthalic acids. The inorganic sulfur compound is preferably a water-soluble sulfide such as a hydrogen sulfide, ammonium sulfide or ammonium polysulfide. However, elemental sulfur, sulfur dioxide, water-soluble sulfites and water-soluble thiosulfates, and the like, may be employed in the reaction as the sulfur material containing sulfur at a valence below plus 6.

The net reaction when xylenes are oxidized is shown by the following equation:

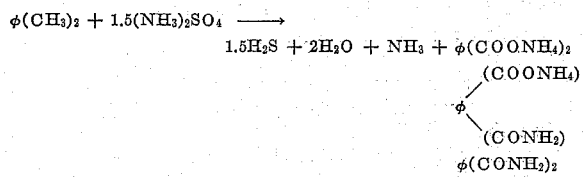

The mixture of ammonium phthalate, ammonium phthalate monoamide and phthalic diamide aggregates 1 mole in the above equation, while one additional mole of water is formed for each equivalent of amide formed in lieu of ammonium salts.

As indicated by the above equation, 1.5 moles of ammonium sulfate are required to oxidize 1 mole of xylene to a phthalic acid product (i. e., 0.75 mole of sulfate oxidizes one methyl group to a carboxyl group). A molar excess of ammonium sulfate is desirably employed and ordinarily from about 1.55 moles to 1.75 moles of ammonium sulfate are charged to the reaction for each mole of xylene fed. Xylene feeds may commonly contain up to 10% of paraffinic hydrocarbons and, where paraffins are present, larger amounts of ammonium sulfate will be required to achieve complete conversion of the xylene, since the paraffin oxidation consumes a relatively larger amount of oxidizing agent.

While the above equation does not show water as a material participating in the reaction, the presence of water in considerable amount is necessary for good conversions and yields. For good operation it is desirable to charge at least 25 moles of water per mole of organic compound to the reaction zone. 30 to 60 moles of water per mole of hydrocarbon facilitate good conversions and yields. Even larger amounts of water may be employed, the only adverse effect being that a larger proportion of the available reaction space is occupied by the water so that the throughput of feed per unit volume of reaction space is lower.

The addition of a sulfur compound having sulfur at a valence below plus 6 to the reaction mixture serves to increase the rate of reaction. The effective oxidizing agent of course is the sulfate ion, but its effectiveness, especially from the standpoint of rate, is markedly increased by the presence of a sulfur compound containing sulfur at a valence below plus 6, e. g., a sulfide. The amount of sulfide charged to the reaction zone is desirably in the range from 0.05 to 0.3 mole per mole of organic compound, and preferably in the range from 0.2 to 0.25 mole per mole of organic feed. Optimum proportions of reactants when a substantially pure xylene is being oxidized are 1.6 to 1.7 moles of ammonium sulfate per mole of xylene, 30 to 40 moles of water per mole of xylene, and 0.2 to 0.3 mole of sulfide or polysulfide per mole of xylene. When the sulfide employed is ammonium polysulfide, about .25 mole of ammonium polysulfide containing about .38 gram atom of sulfur per mole of xylene appears to be optimum.

While the above-described process is characterized by substantially complete conversion of the xylene feed and yields of phthalic acid values in the form of amides and ammonium salts which are of the order of 90% of theoretical or higher, the recovery of essentially pure phthalic acids substantially completely free of combined nitrogen which are suitable for use in alkyd resin and high polymer manufacture presents considerable difficulty. The crude reaction product can be successfully hydrolyzed to produce commercially acceptable phthalic acids by treatment with water and a strong mineral acid at temperatures of the order of 500° F. The hydrolysis reaction mixture under these severe conditions is extremely corrosive and presents serious materials and maintenance problems to those who would practice this method of purification.

It has now been found that substantially pure phthalic acids can be recovered from mixtures predominating in phthalic acid amides and ammonium salts by heating the mixture with water and at least one monocarboxylic acid selected from the group consisting of benzoic acid and toluic acids in a digestion zone to a temperature in the range from about 400° F. to 700° F., acidifying the digestion product with a strong acid to convert ammonium aromatic carboxylic acid salts contained in the digestion product to aromatic carboxylic acids and concurrently to form ammonium sulfate, separating aqueous ammonium sulfate from the aromatic carboxylic acids contained in the acidified product, heating the aromatic carboxylic acids in a conversion zone to a temperature in the range from about 400° F. to 700° F. to convert residual amides contained in said aromatic carboxylic acids to aromatic mononitriles, withdrawing vaporized aromatic mononitriles from the conversion zone, withdrawing a liquid aromatic carboxylic acid phase substantially completely free of combined nitrogen from the conversion zone, cooling the aromatic carboxylic acid phase to produce a mixture of solid phthalic acid and liquid aromatic monocarboxylic acid and separating the solid phthalic acid from the mixture.

The process of the invention will be better understood by reference to the appended drawing, which is a block flow diagram illustrating a process flow suitable for the practice of one embodiment of the invention.

An xylene feed, usually meta-xylene or para-xylene, and the oxidizing agent described in my copending application Serial No. 371,209, now Patent No. 2,722,549, referred to above are passed into the oxidation zone which is desirably operated at about 630° F. and under a pressure of about 300 p. s. i. g. The space velocity in the reaction zone is ordinarily about 0.15 liquid volume of xylene per volume of reaction space per hour. The crude reaction product is passed into a pressure let-down zone where the temperature of the crude reaction product is reduced to 400 to 500° F. and the pressure of the crude reaction product is reduced to 500 to 1500 p. s. i. g. Hydrogen sulfide and ammonia vapors are withdrawn from the pressure let-down zone and passed into the sulfur dissolver. Liquid sulfur separates in the bottom of the pressure let-down zone and is withdrawn and passed into the sulfur dissolver. The depressurized crude reaction product is passed from the pressure let-down zone into a digestion zone where it is heated with a monocarboxylic acid, usually benzoic acid or toluic acid and conveniently a mixture of benzoic acid and toluic acid which is produced during the oxidation as a by-product as the result of the oxidation of ethyl benzene contained in the xylene feed, as a result of a minor amount of decarboxylation of phthalic acid and as a result of incomplete oxidation of a very minor proportion of the xylenes fed to the oxidation zone. The quantity of monobasic aromatic acid employed is at least equivalent to the combined nitrogen content of the oxidation product considered as equivalents of ammonia. Preferably a molar excess of monobasic acid over available phthalic acid in the product is employed. The weight of benzoic acid and/or toluic acid charged to the digestion zone is ordinarily 1 to 10 times the weight of the phthalic acid content of the depressurized crude reaction product. The digestion zone is operated at temperatures in the range from about 400° F. to 700° F. and usually at temperatures in the range from 450° F. to 630° F. The pressure in the digestion zone is ordinarily in the range from 600 to 2000 p. s. i. g. and is usually somewhat in excess of the equilibrium pressure of water vapor at digestion temperature. Residence time in the digestion zone may range from 2 minutes to 1 hour and is ordinarily from 10 to 40 minutes.

Residual hydrogen sulfide contained in the crude reaction product is removed from the digestion zone and a part or all of it may be passed into the sulfur dissolver as required. The digested reaction product is passed from the digestion zone into a sulfur settler and residual elemental sulfur is withdrawn from the sulfur settler and passed into the sulfur dissolver. Steam may be passed into the sulfur settler to complete the stripping of $H_2S$ from the reaction mixture if desired. The digestion reaction mixture substantially free of elemental sulfur is passed from the sulfur settler into an acid springing zone. During the digestion a substantial proportion of the amide content of the oxidation reaction product is converted to ammonium benzoate and/or ammonium toluate. Accordingly, the material entering the acid springing zone has a substantial content of ammonium salts of aromatic carboxylic acids, both monocarboxylic acids and phthalic acids. A strong acid is passed into the acid springing zone in amount sufficient to combine with the ammonium ion contained in the feed to the acid springing zone forming the ammonium salt of the strong acid and liberating the aromatic carboxylic acids. While any strong acid is suitable for use in the acid springing step, it is preferred to employ sulfuric acid since the ammonium sulfate produced when it is used can be returned to the oxidation zone where it functions as the oxidizing agent. The acid springing step is ordinarily conducted at a temperature above the melting point of benzoic acid and below about 400° F. After the springing of the carboxylic acids from their ammonium salts is completed in the acid springing zone, the reaction product mixture is passed into a phase separation zone. The phase separation zone is also operated at a temperature above the melting point of benzoic acid or toluic acid or mixtures thereof and below about 350° F. The charge to the phase separation zone contains aqueous ammonium sulfate, molten benzoic and/or toluic acid and solid phthalic acid. In the phase separation zone a rather unusual type of phase separation occurs. A molten benzoic and/or toluic acid phase containing essentially all of the solid phthalic acid settles out as a bottom layer and a supernatant layer of aqueous ammonium sulfate is formed. The ammonium sulfate layer is withdrawn and passed into an evaporator where it is concentrated and then returned to the oxidation zone to oxidize further quantities of xylene. The lower organic phase comprised of molten benzoic and/or toluic acid containing suspended solid phthalic acid and having an appreciable content of dissolved water is withdrawn from the phase separation zone and passed into a dehydration zone where it is heated to remove substantially all of the water contained. The dehydrated acid mixture is withdrawn from the dehydration zone and passed into a conversion zone. The acid mixture at this stage in the process has a considerably lower combined nitrogen content than did the crude oxidation product, but the residual combined nitrogen content is appreciable, being of the order of 1.5 to 3.0% by weight calculated as ammonia. In the conversion zone the mixture of acids and combined nitrogen impurities is heated to a temperature in the range from about 400° F. to about 700° F., and preferably in the range from about 450° F. to 600° F., for a period ranging from 5 minutes to about 4 hours, the time varying inversely with the temperature. In the conversion zone essentially all of the residual combined nitrogen is converted to benzonitrile and/or tolunitrile which is removed from the conversion zone in the vapor state. It is desirable that the benzonitrile and/or tolunitrile be removed from the conversion zone rapidly and rapid removal is facilitated by withdrawing appreciable quantities of monocarboxylic acid vapors from the conversion zone together with the nitrile vapors. The aromatic mononitrile so removed may be withdrawn as a product of the process or may be hydrolyzed to the corresponding aromatic carboxylic acid and reused in the process as desired, or recycled to the oxidation zone, in which it is hydrated to amides and ammonium salts in the same proportion as obtains among other carboxyl groups produced. When removal of combined nitrogen from the conversion zone is complete, the molten acid mixture is passed into a crystallization zone where it is cooled to a temperature above the melting point of the aromatic monocarboxylic acids, but below about 300° F., to crystallize the phthalic acids. The cooling is conveniently accomplished by introducing a small amount of water into the crystallization zone and refluxing it until the desired crystallization temperature is attained. After crystallization is complete, a slurry of solid phthalic acid crystals in molten benzoic-toluic acid is withdrawn and passed into a filtration zone where phthalic acids are separated from the monocarboxylic acids as a filter cake. The molten aromatic monocarboxylic acids are withdrawn as a filtrate and returned to the digestion zone. A portion of the filtrate is ordinarily withdrawn as a product, since there is a net production of aromatic monocarboxylic acids in the oxidation step. The withdrawal of a bleed stream of aromatic monocarboxylic acids further serves to prevent the build-up of side reaction products in the recirculating aromatic monocarboxylic acid stream. The phthalic acid filter cake is withdrawn from the filtration zone and passed into a reslurrying and washing zone where it is extracted and washed with water or xylene, or both, to remove entrained aromatic monocarboxylic acid. Substantially pure nitrogen-free phthalic acids are recovered from the washing zone.

In the sulfur dissolver hydrogen sulfide, ammonia, elemental sulfur and a portion of the ammonium sulfate stream en route to the oxidizer are brought together and the sulfur is dissolved to produce a solution of ammonium polysulfide which is charged to the oxidation zone together with the ammonium sulfate solution to increase the rate of oxidation of xylene by ammonium sulfate which is the effective oxidizing agent in the process.

If desired, the process flow above described may be modified by omitting the pressure let-down zone intermediate the oxidation zone and the digestion zone. When operating in this manner substantially pure hydrogen sulfide is recovered from the digestion zone and all of the nitrogen contained in the crude oxidation product is converted to ammonium sulfate in the acid springing step. Operation in this manner requires that ammonia be provided from an outside source to supply the sulfur dissolver.

If desired, the phase separation zone may be substituted by a crystallization and filtration treatment in which the effluent from the acid springing step is cooled to crystallize substantially all of the organic materials and these are then separated from an aqueous ammonium sulfate solution by filtration.

The oxidation reaction product is desirably treated with activated charcoal or other solid adsorbent in the course of the purification in order to improve the color of the final acid product. The charcoal treating can be carried out after pressure let-down and prior to introduction of the oxidation product into the digestion zone. More desirably, a charcoal treating step is introduced into the process flow at a point intermediate the digestion zone and the acid springing zone, and preferably between the sulfur settler and the acid springing zone.

contained 0.006% by weight of nitrogen determined as ammonia.

*Example 2.*—The operation described in Example 1 was repeated, omitting the bleeding of hydrogen sulfide and ammonia from the crude oxidation product prior to digestion substituting toluic acid for benzoic acid and reducing the digestion time to 34 minutes. The nitrogen content of the digestion product calculated as ammonia was approximately 1% higher than that of the digestion product of Example 1. This digestion product was then treated as in Example 1 and isophthalic acid was recovered which had a nitrogen content of 0.015 calculated as ammonia.

*Example 3.*—Example 1 was repeated, substituting para-xylene for meta-xylene as the feed to the oxidation zone. All of the process steps were carried out as in Example 1 and the results obtained generally parallel those of Example 1. The purified terephthalic acid product had a nitrogen content of 0.01% by weight determined as ammonia.

*Example 4.*—The process of Example 1 was repeated, with a view of shortening the residence time in the conversion zone. It was found that the reaction rates in the conversion zone were very appreciably increased when small amounts from 0.1% to 1% by weight of sulfuric acid, sodium bisulfate, ammonium sulfate, ammonium bisulfate were added to the reaction mixture in the conversion zone.

Operable and preferred conditions for use in the process steps are tabulated below:

*Operating conditions*

| | Digestion Zone, °F. | Acid Springing Zone | Phase Separation Zone | Conversion, °F. | Crystallization Zone | Filtration Zone |
|---|---|---|---|---|---|---|
| Operable | 400–700 | Atmospheric—400° F. | Melting point of acids to temperature at which mixture becomes homogeneous. | 400–700 | Same as Phase Separation Zone. | Same as Phase Separation Zone. |
| Preferred | 450–630 | 100–300° F. | 150°–300° F. | 450–600 | 150–300° F. | Do. |

The process of the invention is illustrated by the following examples:

*Example 1.*—194 parts by weight of meta-xylene, 990 parts by weight of water, 400 parts by weight of ammonium sulfate, 128 parts by weight of 23% ammonium sulfide and 22.5 parts by weight of sulfur were introduced into the oxidation zone and subjected to a temperature of 625° F. with a residence time of 1 hour. The crude oxidation reaction product was depressurized with cooling until the reaction products were predominantly in liquid phase, uncondensed ammonia and hydrogen sulfide being separated from the reaction mixture. The reaction product was then introduced into the digestion zone together with 1063 parts by weight of benzoic acid. This quantity of benzoic acid provided a mole ratio of benzoic to recoverable isophthalic acid of 5:1. The mixture was maintained in the digestion zone at a temperature of 500° F. for a period of 43 minutes. Products were bled from the digestion zone with cooling to about 220° F. Sulfuric acid was added to the digestion reaction product to spring carboxylic acids from ammonium salts. Aqueous ammonium sulfate was separated from the resultant mixture by phase separation at 200° F. The heavier organic phase was passed into the conversion zone and there heated to a temperature ranging from 490 to 507° F. for a period of 95 minutes. During this period 200 parts by weight of water and 165 parts by weight of benzonitrile and benzoic acid were removed as vapors. The effluent from the conversion zone was cooled and filtered at 300° F. The filter cake was washed with xylene, reslurried with water, filtered and dried. The isophthalic acid product had a neutral equivalent of 83.7 and a saponification equivalent of 83.8. The product

I claim:

1. A process for recovering phthalic acids from mixtures comprising phthalic acid amides and ammonium phthalates which comprises heating said mixture with water and at least one monocarboxylic acid selected from the group consisting of benzoic acid and toluic acids in a digestion zone to a temperature in the range from 400° F. to 700° F., acidifying the digestion product with a strong acid at from atmospheric temperature to 400° F. to convert ammonium aromatic carboxylic acid salts contained in said product to aromatic carboxylic acids and concurrently form the ammonium salt of the strong acid, separating the aqueous ammonium salt from the aromatic carboxylic acids and amides contained in the acidified product, heating the aromatic carboxylic acids and amides in a conversion zone to a temperature in the range from 400° F. to 700° F. to convert residual amides contained in said aromatic carboxylic acids to aromatic mononitriles, withdrawing aromatic mononitriles from the conversion zone, withdrawing a liquid aromatic carboxylic acid phase from the conversion zone, cooling the aromatic carboxylic acid phase to produce a mixture of solid phthalic acid and liquid aromatic monocarboxylic acid and separating the solid phthalic acid from the mixture.

2. A process for recovering phthalic acids from mixtures comprising phthalic acid amides and ammonium phthalates which comprises heating said mixture with water and at least one acid selected from the group consisting of benzoic acid and toluic acids in a digestion zone to a temperature in the range from 450° F. to 630° F., cooling the mixture to 100 to 300° F. and acidifying the cooled mixture at from atmospheric temperature to 400° F. to free aromatic carboxylic acids from ammonium aromatic carboxylates contained in the cooled mixture, settling the resultant mixture at from 150° F. to 300° F. to separate an organic phase and an aqueous phase, heating the organic phase in a conversion zone to a temperature in the range from 400° F. to 700° F., withdrawing vapors comprising water and aromatic mononitrile from the conversion zone, withdrawing a liquid phase from the conversion zone and cooling it to 150° F. to 300° F. to produce a slurry of solid phthalic acid in molten aromatic monocarboxylic acid and at 150° F. to 300° F. separating the solid phthalic acid from the slurry.

References Cited in the file of this patent

UNITED STATES PATENTS

| | | |
|---|---|---|
| 2,283,991 | Hill | May 26, 1942 |
| 2,723,995 | Rutherford | Nov. 15, 1955 |
| 2,734,079 | Aroyan et al. | Feb. 7, 1956 |
| 2,768,200 | Busby | Oct. 23, 1956 |

OTHER REFERENCES

Noller: "Chemistry of Organic Compounds," page 244 (1951).